Oct. 26, 1954   G. H. VOELKER   2,692,951

APPARATUS FOR MEASURING SHAFT ROTATION

Filed Feb. 26, 1952

*INVENTOR.*
GEORGE H. VOELKER
*BY*
Busser, Smith and Harding
ATTORNEYS

Patented Oct. 26, 1954

2,692,951

UNITED STATES PATENT OFFICE 2,692,951

APPARATUS FOR MEASURING SHAFT ROTATION

George H. Voelker, Fort Washington, Pa., assignor to Sun Oil Company, Philadelphia, Pa., a corporation of New Jersey Application February 26, 1952, Serial No. 273,470

1 Claim. (Cl. 250—83.3)

This invention relates to the measurement of rotation of an element by the utilization of a source of radioactive radiation. In particular the invention contemplates an arrangement for measuring exactly the speed of rotation of an element, such as a drive shaft, by eliminating interference from other radiation sources and also by transmitting radiations from the radioactive source in a confined path.

Radioactive radiation has been applied to various uses, such as the measurement of thickness, the determination of level, the determination of composition of mixtures and other uses, involving the scattering or absorption of emitted radiations by the material acted upon, and the condition or characteristic of the material determined directly from a measuring or indicating device which has been calibrated for the particular use.

According to the present invention, the radioactive source is embedded in or secured within a recess in the rotating element and arranged to direct radiations through the outer wall of the element directly to a radiation detector which is so positioned as to receive only radiations which are so directed. The radiation source may be any known radioactive substance and in accordance with the particular substance used it will be shielded by a housing constructed of a metal having an atomic number which is sufficiently high to absorb or prevent emitted radiations from passing through the body of the element and to direct radiations laterally through an opening in the housing.

The invention can be utilized readily with equipment existing in plants, such as oil refineries, for determining the speed of rotation of drive shafts and then regulating the shaft driving mechanism through suitable governing means.

For a more complete understanding of the invention, reference may be had to the accompanying drawings in which.

Figure 1:
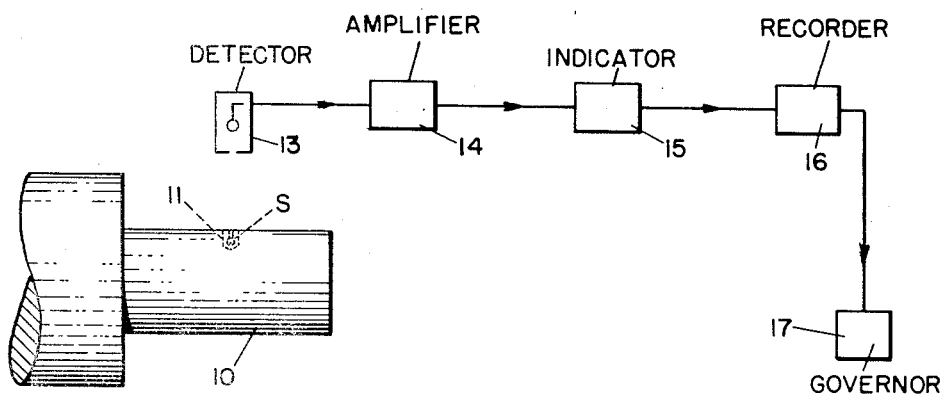
Figure 1 is a generally diagrammatic illustration of the invention applied to a rotating shaft.

Referring to Figure 1, the numeral 10 indicates the drive shaft, for example, of a gas or steam turbine. The radioactive material S, which may be radium or a radium compound, is positioned within a lateral recess 11 formed in the shaft and radiations from the source are directed through the recess to a detector 13. The radiations picked up by detector 13 are increased in value by amplifier 14 sufficiently to be registered on indicator 15 and recorded at 16. If it is desired to control the speed of rotation of shaft 10 a governor 17 may be suitably connected to the source of power for driving the shaft 10. Such an arrangement is not shown in the drawings since it is not considered an essential feature of the invention.

Figure 2:
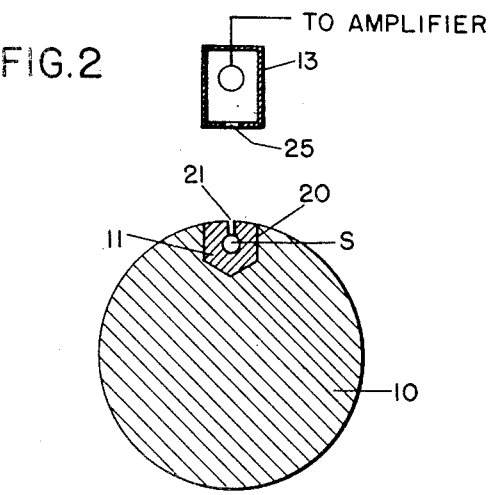
Figure 2 is an enlarged view of a portion of Figure 1 to show details.

In Figure 2, a shield or housing 20 extends into the recess 11 and is suitably secured to prevent its dislodgement during the shaft's rotation and the source S is fixed therein and radiations from the source pass through an opening 21 formed in the outer wall of the shield. The shield will be made of a material such as lead or aluminum which will absorb some of the emitted radiations and prevent their passing through the body of shaft 10 and direct other radiations through the aperture 21 in the shield to be received by the detector 13 which will be positioned in sufficiently close proximity to the shaft 10, and may be otherwise arranged, to pick up all radiations which pass through the aperture 21.

Obviously other materials to direct radiations from the source S through the opening 21 and to prevent passage of radiations through the body of the shaft could be used without departing from the spirit of the invention which is limited only by the scope of the appended claim.

I claim:

A device for counting successive revolutions of a rotating element which comprises a source of penetrative radiations, a housing for said source extending laterally inward through a recess in the wall of the element, said housing being formed of a material having an atomic number sufficiently high to prevent radiations from passing from the source through the body of the element and said housing having a restricted opening therein for directing the passage of radiations laterally outward from the source in a confined path, a detector positioned adjacent to said element, said detector having a restricted opening for the reception of radiations when the element has completed a revolution and the restricted openings in the element and the detector are in alignment.

References Cited in the file of this patent

UNITED STATES PATENTS

| Number | Name | Date |
|---|---|---|
| 2,499,889 | Teichmann | Mar. 7, 1950 |
| 2,566,868 | Allia | Sept. 4, 1951 |